Aug. 20, 1929. R. H. GAYLORD Re. 17,411

SIGNALING SYSTEM FOR ELEVATORS

Original Filed Aug. 22, 1923 2 Sheets-Sheet 1

INVENTOR.
ROBERT H. GAYLORD
BY Arthur P. Knight and Alfred W. Knight
ATTORNEYS

SIGNALING SYSTEM FOR ELEVATORS

Original Filed Aug. 22, 1923 2 Sheets-Sheet 2

INVENTOR.
ROBERT H. GAYLORD
BY Arthur P. Knight and
Alfred W. Knight
ATTORNEYS

Reissued Aug. 20, 1929. Re. 17,411

UNITED STATES PATENT OFFICE.

ROBERT H. GAYLORD, OF LOS ANGELES, CALIFORNIA.

SIGNALING SYSTEM FOR ELEVATORS.

Original No. 1,696,842, dated December 25, 1928, Serial No. 658,736, filed August 22, 1923. Application for reissue filed May 31, 1929. Serial No. 367,477.

This invention relates to an improvement on a type of elevator signaling system disclosed in the patent to James B. Smalley and Charles A. Reiners, No. 826,752, dated July 24, 1906, and one of the main objects of the present invention is to provide such an elevator signaling system with means for controlling the floor or landing signals and car operator's signals in such a manner that only one landing signal and one operator's signal will be displayed at any one time at or for a floor for a bank of elevators travelling in the same direction, thereby avoiding confusion to passengers and operators which arises at the present time from simultaneous display of signals for several elevators approaching the same landing.

A further object of the invention is to provide means whereby the operator of a car within the signal zone may so control the signals that they will be transferable to the next following car to enter the zone, the completion of said signal transfer being accomplished when the aforesaid following car enters within the signal zone. This transfer of signals between elevators approaching a landing about the same time is very desirable where a large number of passengers are waiting at a landing to be served, as the operator of the car in control of the signals can transfer the signals, thereby calling the passengers' attention to the fact that another car is also available to serve them. An important object of the invention is to provide means whereby any elevator operator (in case he is receiving a signal) may advise himself whether or not another car is within the same signal zone, and govern his running accordingly.

A still further object of the invention is to provide means whereby the operator in any elevator car may so control the signals as to permit him to take on passengers at a landing and on leaving the landing allow the signals to remain in operative transferable condition so as to provide for operation under the control of a succeeding car.

Another object of the invention is to apply in connection with the elevator signal system shown in the Smalley and Reiners patent aforesaid, an interlock such as described in patent granted to me November 25, 1919, No. 1,322,895, so as to secure the advantages of such interlock in connection with the type of signal system which is shown in said Smalley and Reiners patent and which is now in general use.

An important feature of my invention is the introduction or addition to the landing and car signal circuits, of devices which will change or alter the current flow to the signals, and the responsive change thereby brought about being used for signaling purposes in the routine operation of an elevator signal installation.

Another important feature of my invention is an elevator signaling means whereby initial circuits are established to the signals for the purpose of coacting in the operation of the signal controlling means, the signal controlling means in turn being under control of interlocking means.

The accompanying drawings illustrate diagrammatically an apparatus suitable for carrying out my invention:

Figure 1:
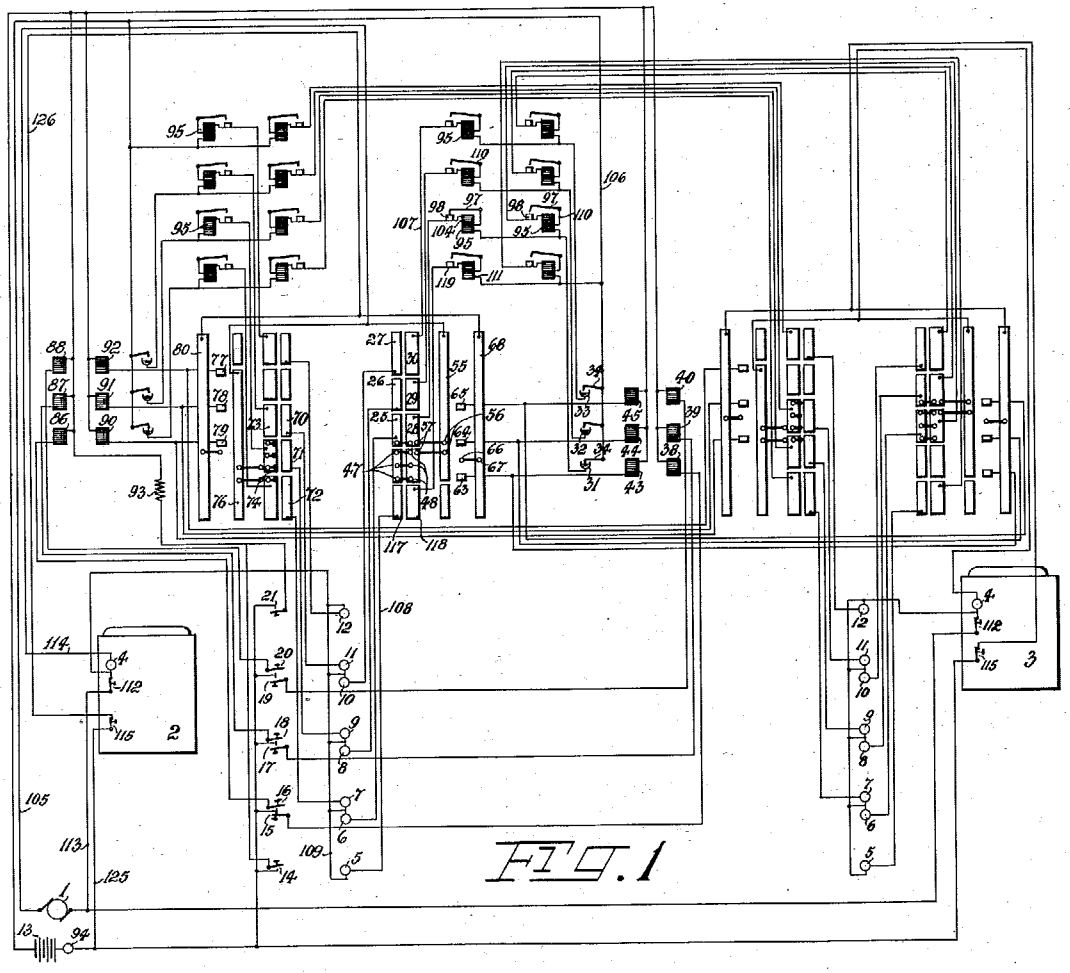
Fig. 1 is a diagram of the circuit connections for two elevators.

In Fig. 1 of the drawings I have illustrated diagrammatically the contacts for the controlled switches or commutators for two elevators. The construction and operation of said switches is identical with the construction and operation of the commutators shown and disclosed in said Smalley and Reiners patent, the switches and commutators being, however, indicated in the drawing as adapted for a five story or five landing signal system in place of seven landings as shown in the Smalley and Reiners patent.

Figure 6:
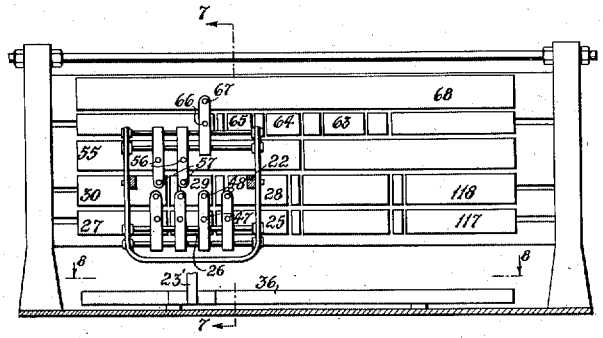
Fig. 6 is a longitudinal section of the car operated switch or commutator.
Figure 7:
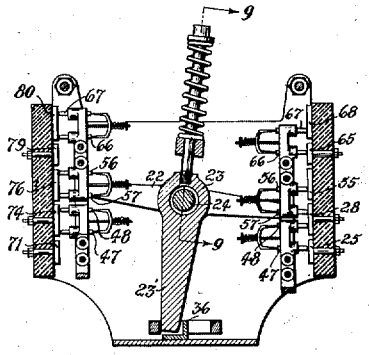
Fig. 7 is a section on line 7—7 in Fig. 6.
Figure 8:
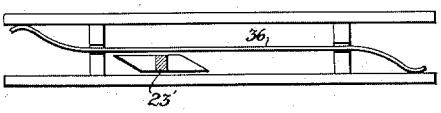
Fig. 8 is a section on line 8—8 in Fig. 6.
Figure 9:
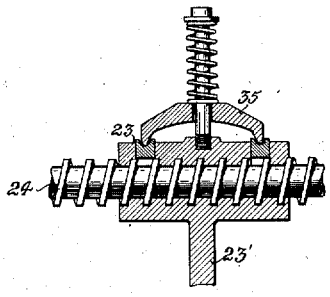
Fig. 9 is a section on line 9—9 in Fig. 7.

In Fig. 1 there has been omitted from the diagram most of those contact-plates which form no part of the electrical features in order to simplify the same. In this diagram 1 is a source of electricity—such, for example, as an ordinary dynamo. 2 and 3 are elevator cars which are adapted to travel up and down in their respective shafts, and 4 is an electrically controlled signal carried by each car and which is preferably in the form of an electric lamp. Electrically controlled signals located along the elevator shaft may also be provided for signaling the intending passenger that a certain elevator car is approaching him in the direction which he desires to go. These signals are also preferably electric lamps and are indicated at 5 to 12, the top and bottom floors each being provided with a single lamp for each elevator, and each of the intermediate floors with a pair of lamps for each elevator, such as 8 and 9 for the third floor. These will be usually located outside of the elevator shaft adjacent to each doorway, as is common at the present time, one of said lamps serving to indicate a downwardly moving car and the other one an upwardly moving car. There is also provided suitable hand operated mechanism located at each floor, such as ordinary push buttons, by which the intending passenger may control part of any signal circuit, so that after he has pushed one of said buttons he will close or cause to be closed a break in the said signal circuit, so that when the commutator closes the other break in such circuit the signal will be given. These push buttons or circuit closers are indicated at 14 to 21, two of them being located at each floor, except the top and bottom floors, the upper ones, being to signal upwardly moving cars, and the lower ones, being to signal downwardly moving cars. Each push button has a contact connected to one side of a battery 13 and a contact member connected to one of the setting magnets hereinafter set forth, the other side of each setting magnet being connected to the other side of the battery 13. Two cars with corresponding floor signals and commutators are shown in Fig. 1, but it will be evident that the system may be adapted for any desired number of shafts, and that the same may be cross wired, so that one set of push buttons will control the circuits for all the cars of that bank, as is common in this art. It is not thought necessary to illustrate this duplication and cross connection in the drawings, as the same will be evident to any person skilled in this art. A car operated circuit controller, switch or commutator is provided for each elevator shaft and is operated by connection with the corresponding car. The expression "car operated" in this connection, means operated in correspondence with the movement of the car. The commutator is adapted to determine the time when the signal shall be operated—that is, when the lights may be lighted up, providing that a push-button has been pushed to close the other normally open break in the signal circuit. Each car operated circuit controller or commutator consists of suitable fixed and relatively moving contacts and in the present embodiment the brushes are indicated as constituting the moving members thereof, said brushes being arranged in two groups respectively corresponding to up and down travel of the car and adapted to contact respectively and alternatively with two groups of fixed contacts. Furthermore each said car operated circuit controller or commutator comprises a moving member or brush carrier 22 (see Figs. 6 and 7) adapted to be moved back and forth by operation of the corresponding car, said moving member, for example, comprising a nut 23, which is adapted to work on a screw shaft 24 operated by connection with the car operating means, and suitable means are provided for tilting said moving member on said shaft to shift the brush carrier so that one group of brushes is operatively engaged with the corresponding fixed contacts while the elevator car is travelling upwardly and to shift the brush carrying means so as to cause the other group of brushes to operatively contact with the other corresponding group of fixed contacts during the downward travel of the elevator car. The means for reversing the movement of the brush carrier may consist of a frictional bearing means as shown at 35 in Fig. 9, whereby the nut 23 is caused to tend to turn one way or the other, in correspondence with the reversal of motion of screw shaft 24, and a guide member 36 adapted to engage an arm 23′ on nut 23 to hold the brush carrier to one side while it is travelling in one direction, and to the other side while it is travelling the opposite direction, all as set forth in the patent to Smalley and Reiners above referred to. The circuit connections are also controlled by mercury pots and restoring and setting magnets, which have been shown in Fig. 1 adjacent the commutator to more clearly indicate their relation; but they may be placed wherever convenient, and, in fact, are usually placed upon a separate support by themselves, being suitably wired from each separate commutator of the bank of elevators, as indicated in Fig. 1.

Figure 4:
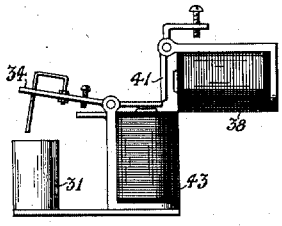
Fig. 4 is a side elevation of the signal setting and resetting device.
Figure 5:
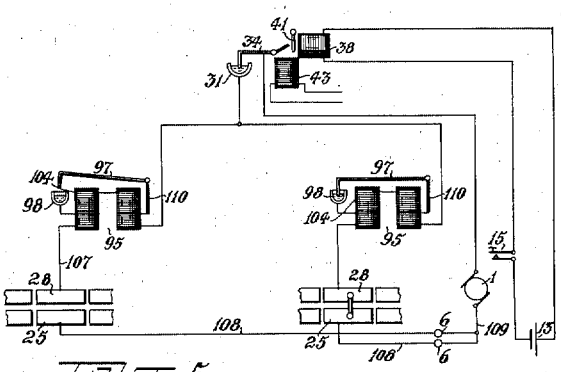
Fig. 5 is a diagram of the interlock control devices.

The group of fixed contacts for each "down" signal control, in the commutator, comprises two series of contact plates; but they need not necessarily be of the form shown in all cases. One such series is indicated at 25 to 27 and the other series at 28 to 30. These two series above indicated are for the car as it moves downwardly, and it will be observed that each plate of the series 25 to 27 has connected with it a 'down" light—that is lamp 6 is connected to plate 25, lamp 8 to plate 26, &c. The plates 28 to 30 are connected to switches (indicated as mercury pots 31 to 33 having pivoted contact arms 34) the connections including interlocking electromagnetic devices hereinafter described. Said pivoted arms 34 for mercury pots 31 to 33 are operated by the setting magnets 38 to 40 controlled by the respective "down" push buttons 15, 17, etc., and said pivoted arms are all connected to one side of dynamo 1. Each setting magnet has an armature 41 (see Fig. 4) controlling the pivoted contact arm 34. The pivoted arm 34 of each switch is normally out of contact with the mercury, and therefore causes a break in the signal circuit, and it and the mercury pot constitute a switch. It will be obvious that there is no limitation to this form of switch, but this mercury pot and pivoted lever construction is a convenient one to use, as has been found by actual practice. The pivoted lever may be caused to drop into the pot by different mechanism; but it has been found that a magnet controlled by a floor push button is a convenient and effective means to this end. In the present instance there is provided a setting magnet, such as 38 to 40 (see Fig. 4) connected to a corresponding push button, so that when a button, such as 15, is pushed it will close a circuit from battery 13 through the corresponding setting magnet 38, thereby attracting its armature 41 and releasing the lever 34, which will drop into the pot, as indicated in the diagram. There is also provided a restoring magnet, such as indicated at 43 to 45, for each arm 34 for restoring the same to the normal position shown in Fig. 4 after the car starts to move away from the floor for which the signal has been given. This will be described more in detail hereinafter. It will be observed from the above that each of the intermediate floors is served by one of said floor signals, such as 6, a plate, such as 25, of one of said series connected therewith, and a plate, such as 28, of the other series which is connected to the source of supply through a switch or other circuit closing or contact means, which is individually controlled as hereinafter described by an electromagnetic control device included in a control circuit which is in turn controlled by a hand operated mechanism, such as push button 15, located at said floor at which the signal 6 is also located. In order to make electrical connection between plates 25 and 28, etc., there is provided a brush or brushes for each series of plates, these brushes, indicated at 47 and 48 being electrically connected as indicated. It will be obvious that when any one pair of these brushes, 47 and 48, touch plates 25 and 28, respectively, the floor lamp 6 will be lighted up, providing all other breaks in the circuit have previously been closed, as the third normally open break in the circuit (between plates 25 and 28) will then be closed and this break will remain closed so long as any pair of brushes connects these plates. It is preferred to provide several pairs of these brushes as indicated at 47 and 48, and space the pairs a distance apart less than the width of any single plate of the series, so that the plates, 25 and 28, for example, will be electrically connected while the car is moving for several floors, so that the floor light will light up several floors in advance of the car and remain lighted until the car reaches the floor. This relative arrangement is shown in the diagram and will be referred to hereinafter when the particular construction of the brush carrier is discussed hereinafter. It will be observed that the circuit from the dynamo passes through the car-light 4 and then to the long contact strip 55, and there is provided a pair of brushes 56 and 57, connected as indicated, the brush 56 rubbing over strip 55 and the brush 57 making contact with the series 28 to 30. It is preferred to provide the long strip 55 and the brush 56, rather than to attach the circuit from the car lamp directly to brush 57; but the construction shown may not be necessary in all cases. The car signal is therefore in circuit with a brush—in this instance brush 57—on the series of contacts 28 to 30. In the present embodiment this brush 57 is a separate brush from any one of the brushes aforesaid, and this is the construction that is preferred; but it will be observed (see Fig. 1) that when these brushes are in the position shown in that figure the brush 57 rests upon the same plate as the brush 48, and at that time said two brushes 57 and 50 are in effect a single brush. In order to light up the car light only a floor or so before the car reaches the floor, brushes 56 and 57 are located behind the brushes 47 and 48, so that the floor light will be lighted up before the car light is lighted. There has also been provided another pair of connected brushes, 56 and 57, so that the car light may be lighted up slightly more than one floor away from the floor at which the car is to stop. Also there has been provided a series of restoring mechanisms for automatically restoring the circuits to normal condition after the car has passed by, in this instance raising the mercury pot arm out of the mercury. Such a series of restoring mechanisms is shown by the restoring magnets 43 to 45, which are all the same as magnet 43 of Fig. 4. It will be observed that, for example, restoring magnet 43 (see Fig. 4) when energized will raise the lever 34 and drop the right end of the same underneath the end of armature 41, where it will be held until the setting magnet 38 is again energized. In order to energize the restoring magnets at the proper time, there are provided a series of contacts 63 to 65 upon the commutator and a brush 66 adapted to ride on said contacts and suitably connected to the battery 13, in this instance by being electrically connected to a brush 67, rubbing over contact strip 68, so that when the car starts to move away from the floor on which the signal has been given, a brush 66 will engage contact 63, say, and energize magnet 43 to break the signal circuit at the mercury pot.

The brushes have been shown in Fig. 1 in the relative positions they occupy as the car is descending, these brushes controlling the signals to a down-moving car. The brushes for that part of the commutator corresponding to an upwardly moving car are shown in such position as to be ineffective in closing connection between the plates 70 to 80 on the up side, which are mounted in positions corresponding to the aforesaid plates 25 etc., on the down side, except, of course, in reverse order. When the car moves upwardly, the brushes for the up contact plates are shifted into a position by means operated by the car, as shown in said Smalley and Reiners patent, so as to make suitable connections for the control of the up signals, so as to operate the up signals and the signal in the car and the up restoring magnets. This shifting of the brushes will be referred to hereinafter. 86 to 88 represent a set of setting magnets, and 90 to 92 a set of restoring magnets for the up side, these magnets being controlled in the same manner as above set forth. The system is therefore provided with means for controlling the signals when the car is moving up, substantially the same as those heretofore described for use when the car is moving down. 93 is a suitable resistance, and 94 is a "night signal" or bell.

Figure 2:
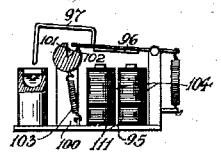
Fig. 2 is a side elevation, partly in section of an interlocking control magnet.
Figure 3:
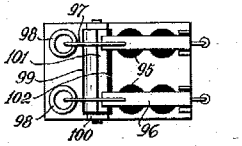
Fig. 3 is a plan view of said interlocking control device.

The above described construction and arrangement of the parts is substantially the same as described and illustrated in the patent to Smalley and Reiners aforesaid, with the exception of the intercontrolling or interlocking means which are according to my present invention incorporated in the connections for the floor landing signals in place of direct connection of the floor landing signals to the mercury pots as set forth in said Smalley and Reiners patent. Said intercontrolling or interlocking means constituting the main feature of the present invention as applied to the control of the landing signals, is shown more fully in Figs. 2 and 3, each intercontrolling or interlocking means comprising a plurality of controlling magnets 95, one for each elevator car or shaft, said magnets being mounted side by side so as to cooperate with an interlock which is common to all of them. Each magnet controls an armature 96 carrying or attached to a pivotal arm 97, which cooperates with a mercury pot 98 to control a shunt circuit as hereinafter described. Each armature or armature lever also cooperates with an interlocking member consisting for example of a shaft 99 of insulating material mounted to turn in bearings 100 and having a notch 101 one face of which 102 is adapted to be engaged by the armature or armature lever so as to turn the interlocking member, said member tending to return to normal position under operation of a spring 103. Said notch in the interlocking members is so formed that when said member is operated by any one armature lever in the manner described, the opposing face of the said notch will pass beneath the armature lever corresponding to the other interlock magnet or magnets and prevent operation of same. The interlock magnet 95 is provided with two energizing coil portions which are connected in series relation and one of which 104 is of such high resistance that when both coils are in circuit the conductance of the circuit as a whole will be insufficient to permit effective illumination of either the car signal or of the landing signal. When any interlock magnet operates its armature to close circuit at 98, said high resistance winding is short circuited and resistance of the circuit as a whole is then sufficiently low to cause increased illumination of the signal of a landing which a car is approaching. In Fig. 2 the two windings are shown as distributed on a pair of magnet cores but in Fig. 1 for simplicity only one member of the pair is shown. As my invention relates primarily to the interlocking feature, the complete circuit therefor will be traced as follows: from dynamo or source of current 1 through wires 105 and 106 to the series of pivotal arms 34, and from the mercury pots 31 etc., corresponding to said pivoted arms, a plurality of branch wires lead to the windings for the respective interlock magnets for the down side of the commutator. The other end of said winding is connected by a corresponding branch wire 107 to a corresponding contact plate 28 etc., at the "down" side of the commutator. The opposing contacts 25 etc., for the "down" side of the commutator are connected by wires 108 to the "down" signals 6, 8, etc., at the floor landings, the other side of each signal being connected by return wire 109 to the other side of dynamo 1. A connection 110 is made from the junction of the two windings aforesaid, to arm 97 so as to establish a shunt connection including said pivoted arm 97 and the corresponding mercury pot 98, so that when said pivoted arm makes connection with said mercury pot the winding 104 is short-circuited but the other winding 111 for magnet 95 is left in circuit. It will be understood that there are as many sets of interlocking devices as there are landing signals, including both "up" and "down" landing signals.

The wire 109 may be directly connected to dynamo 1 but I prefer to include therein a normally closed switch indicated at 112, one side of which is connected by wire 113 to the opposite side of the dynamo 1, and the other side of said switch being connected to the return wire 109, and also to the car signal 4. From said signal a wire 114 leads to the long contacts 55 and 76, aforesaid, in the corresponding commutator so that the wire 113 to the dynamo from the switch operates as a common return for both the car signal circuit and the landing signal circuit and the switch is included in said common return so as to cut out both of said signal connections simultaneously.

115 is a normally closed "transfer-button" or switch in the car by which the operator may open the restoring magnet circuit for that car and thus prevent the restoring magnet from opening the signal circuit at the mercury pot.

One side of said transfer switch may be connected by wire 125 to battery 13 while the other sides of said switch may be connected by wire 126 to the long restoring circuit contact strips 68 and 80 of the car operated switch for that car.

As in the Smalley and Reiners system above referred to the landing signals for the top and bottom floors are connected by operation of the contacts on the commutator irrespective of any push button control. The pair of contacts 117, 118, on the commutator corresponding, for example, to the up signal at the bottom floor (that being the sole signal at that floor) are adapted to be connected by the brushes 47 and 48 aforesaid, the contact 117 being connected to a landing signal, and contact 118 being connected to a switch means 119, controlled by an interlock magnet, as above described for the intermediate landing signals so that only one landing signal can be displayed at one time. Similar contacts and interlocking magnets are provided for the down signal at the top floor.

The operation is as follows:

*First condition.*—Assuming that push button 15 is closed, the corresponding setting magnet 38 is operated to close circuit at 31. The first car to enter the signal zone for that floor will then cause circuit to be closed (by a pair of brushes 47 and 48) between contacts 25 and 28. Current will then flow from dynamo 1 through line 105 and 106 to an arm 34, then to mercury pot 31 and the corresponding electro-magnet 95, and thence by wire 119 to contact 28, thence through brushes 48 and 47, contact 25, a wire 108, lamp 6, wire 109, switch 112, and wire 113 back to dynamo 1. This circuit includes the full resistance of magnets 95, and the initial current that momentarily flows at this time in the signal circuit is consequently insufficient to effectively operate the landing signal lamp 6, but armature 96 being immediately operated, the arm 97 at once short circuits the high resistance 104, so that sufficient current will flow through the aforesaid circuit to effectively illuminate the landing signal 6. Armature 96 at the same time turns interlock member 99, and in case another car follows within the zone the circuit will be established through its high resistance means, but the current will be insufficient to effectively light its landing signal lamp, the interlock preventing the armature from being drawn down to close the shunt circuit for the magnet coil through the mercury pot. When first car passes out of signal zone which means that 47 and 48 pass off of segments 25 and 28, the corresponding magnet 95 is deenergized, said interlock releases and returns to normal, and immediately thereafter the reset circuit is established and all circuits are restored ready for another push button operation. As soon as any car advances far enough into a signal zone to bring the brush 57 into contact with the contact plate (for example 25) which is in connection with the operator's switch 34 and 31, a branch circuit is also closed from the contact, through brush 57, and 56, contact plate 55, wire 114, and car lamp 4, to switch 112, so that the car signal is effectively illuminated, unless another car is in control of that signal zone. Each car is provided with two switches, one from the restoring circuit, and one from the common return of the signal operating circuits. If operator in advanced car doesn't wish to answer the signal he can open both switches in which case the signal is maintained for next following car, whether it is in the zone or not.

*Second condition.*—Suppose car stops at landing to answer a call and operator finds that he cannot carry all the passengers, he simply opens restoring circuit switch 115 and moves on, then as brushes 47 and 48 pass off of contacts 25 and 28, armature 96 is returned to normal and releases interlock so next following car picks up the signal, but the operator of first car maintains his signals until he leaves the floor.

*Third condition.*—Suppose car is approaching a landing or has stopped at the landing and operator knows another car is in the zone, and wishes this following car to assist in taking on passengers, he may open common line switch, and his signals will go out, and following car signals come on thereby attracting passengers to this following car. These three switches (one automatic and two manual) can function singly or collectively to produce distinct results.

Assuming that an elevator enters a signal zone and the operator receives the signal to stop, (say to take on passengers) the operator can by opening his common line switch immediately extinguish both the waiting passenger signal and his car signal, and if a following car travelling in the same direction is within the signal zone for that particular floor or enters it while the switch is open, the signals will be transferred to this following car, this operator receiving his signal to stop and the waiting passenger will be informed that his car will be the next car to arrive at the landing. But one waiting passenger signal for one direction of travel will be in evidence at any floor, likewise but one car signal will be in operation, this eliminates a common cause of confusion both to the waiting passengers and operators, as in the systems now installed as many waiting passengers' signals and operators' signals are presented as there are cars within the signal zone (travelling in the same direction).

An important advantage of this invention is that an operator may transfer the signals to a following car, after receiving a signal and himself passing out of the signal zone, this being done by the simple opening of his reset circuit switch. In this case the reset circuit switch and the car operated switch function together to transfer the signal to the next following car. It is evident that I have provided three separate switches which function differently when operated singly or collectively under certain conditions and thus materially assist in more efficient elevator signaling. Another important advantage is the fact that any car in an installation may be operated independent of the general system, with the entire elimination of false signals which are so confusing in systems now in operation. This feature lends itself particularly where any car in an installation is wanted for express service.

A very important advantage is that this system may be incorporated with installations now in operation with very little changes or interruption of service. Of important value is the flexibility of the signal transferring feature whereby car relation positions do not control or govern the functioning of the signal transfer.

Among the specific points of novelty in the above described system is the flexibility afforded in the general organization for the transferring and control of the signals (in an interlocking elevator signal system), also the unmistakable presentation of the signals both to the waiting passengers and the operator without duplication or possibility of false signals. Moreover the signals relating to each elevator are directly controllable by the operator of that elevator. He may at any time if within the signal zone extinguish all signals relating to his car, or he may transfer a signal received to the next succeeding car, or he may reassume the signal for his own car provided a following car is not in position to receive the transfer of signals. Furthermore he may by momentarily opening and closing transfer switch 112 advise himself whether or not another car is within the signal zone corresponding to the floor at which he has stopped or for which he has received a signal. If upon re-closing this switch his signal does not reappear he will be advised that another car is within the zone and has assumed control of the signals for that floor.

It will be seen that as soon as a car enters a signal zone and is responding to a signal, an initial signal circuit is established for both landing and car signals but ineffective for signaling purposes, the effective potential at the signal being insufficient to effectively illuminate the signal, and that the effectiveness of the signal circuit is dependent upon the interlocking means whether in a locking or normal position.

What I claim is:

1. An elevator signal system for a plurality of cars, comprising landing signals and car-operated switches corresponding to the respective cars; control circuits including a source of current, circuit closers at the respective landings, and electromagnetic controlling devices; signal operating circuits including a source of current, contact means controlled by said electromagnetic controlling devices so as to be operated under the control of the respective control circuits, contact means controlled by the corresponding car-operated switches, intercontrolling electromagnetic devices associated together according to floors and directions of travel of the cars, and corresponding landing signals, and each signal operating circuit initially including a resistance sufficient to prevent effective operation of the corresponding landing signal; contact means controlled by said intercontrolling electromagnetic devices and adapted to short-circuit said resistance in any signal operating circuit upon energization of the corresponding intercontrolling electromagnetic device, so as to permit effective operation of the corresponding landing signal; and interlocking means operated by said intercontrolling electro-magnetic device, and adapted upon operation thereof by the intercontrolling electromagnetic device corresponding to one car to prevent effective operation of any of the other intercontrolling electromagnetic devices associated therewith.

2. An elevator signal system as set forth in claim 1 and comprising in addition a manually operated transfer switch included in and adapted to open each signal operating circuit so as to render the signals controlled thereby inoperative and to de-energize the corresponding intercontrolling electromagnetic device and release the interlocking means operated thereby.

3. An elevator signal system for a plurality of cars, comprising landing signals corresponding to the respective cars; a car operated switch corresponding to each car and having contacts corresponding to the respective landing signals and means operated in correspondance with the movement of the car to control circuit connection at such contacts; signal operating circuits including a source of current and the respective landing signals and also including the corresponding contacts of the car operated switches; control circuits including a source of current and circuit closers at the respective landings and also including electromagnetic means; circuit closers included in the respective signal operating circuits and operated by the respective electromagnetic means aforesaid to close the respective signal circuits; each signal operating circuit also including an electromagnet of sufficient resistance to prevent operation of the signal, and also including a switch controlled by said electromagnet and connections including said switch and a part of said electromagnet and adapted to short circuit said part of the electromagnet to reduce the resistance of the circuit upon operation of the electromagnet, so as to cause increased current to flow in the corresponding signal circuit, and an interlocking member adapted to cooperate with the said electromagnetically operated switches for each floor and direction of travel of the car, to prevent operation of any of said switches while any other of said switches for that floor and direction of travel is in operation.

4. A system as set forth in claim 3 and comprising in addition a manually operated switch in each car, adapted to open the signal operating circuits corresponding to that car and thereby release the interlocking member so as to permit operation of any other electromagnetically operated switch corresponding to the same floor and direction of travel.

5 An elevator signaling system for a plurality of cars, comprising landing signals and car operated switches corresponding with the respective cars, each car operated switch having a plurality of contacts corresponding to the respective landings, and contact means operated in correspondence with the movement of the car for connecting said contact; a car signal in each car; a source of current; control circuits connected thereto and including circuit closers at the landings and corresponding electro-magnetic control means; landing signal operating circuits including a source of current, and each including only one of said landing signals and also including connectable contacts of the corresponding car operated switch, and a corresponding circuit closer operated by the respective electro-magnetic control means, so as to be controlled by the said car operated switches and by said control circuits; car signal operating circuits having current supply connections and including the respective car signals, corresponding contacts of the car operated switch, and corresponding circuit closers operated by the electro-magnetic means aforesaid, so as to be controlled by said car operated switches and by said control circuits; and interlocking means responsive to the operation of any landing signal operating circuit to prevent effective operation of any landing signal or car signal circuit for another car, while such first operating landing signal circuit is mantained.

6. An elevator signal system as set forth in claim 5, and comprising in addition a manually operated transfer switch included in and adapted to open the operating circuits for both the landing signals and the car signals, and thereby release the interlocking means.

7. In a multiple elevator signal system, a plurality of cars, landing signal means individual to each of said cars; signal operating circuits therefor; a plurality of car operated circuit controllers individual to said cars and each provided with contact means included in the circuit for the corresponding car and with moving brush means adapted to cooperate with said contact means to establish connections in said circuits; a source of current included in said circuits; each of said signal operating circuits normally including a resistance means sufficiently great to make the effective resistance of such circuit sufficiently high to render the initial current produced therein upon such establishment of the circuit connection by the corresponding car-operated circuit controller ineffective for operation of the corresponding landing signal, means operated by such initial current for short-circuiting such resistance means so as to reduce the effective resistance of the circuit and render the current therein effective for operation of said landing signal; and interlock means operable upon operation of any one of said short-circuiting means to prevent the shirt-circuiting means for any of the other circuits for the same floor and direction of travel from operating.

8. In a multiple elevator signal system, a plurality of cars, car operated circuit controllers individual to said cars; a control circuit including a manually operated circuit closer and an electromagnetic control device; a circuit closer controlled by said electro-magnetic control device; signal operating circuits individual to said cars and each including contacts associated with the corresponding car-operated circuit controller, and said signal operating circuits all including said electro-magnetically controlled circuit closer in common, said circuit controllers operating in conjunction with said last named circuit closer to establish the corresponding signal operating circuits; a source of current; each of said signal operating circuits being connected to said source of current so as to produce a current in such circuit upon establishment thereof, and each of said signal operating circuits including a landing signal and normally including a resistance means sufficient to render the initial current therein ineffective for operating said landing signal; electro-magnetic means in each of said signal operating circuits; means operated by said last named electro-magnetic means upon energization thereof and adapted to short circuit said resistance means in the corresponding signal operating circuit so as to decrease the effective resistance of such circuit and render the current therein effective for operation of the corresponding landing signal, and interlock means operable by such short circuiting means for one of said circuits to prevent operation of the short circuiting means for any other of said signal operating circuits.

9. An elevator signal system for a plurality of cars, comprising car signals and car-operated switches corresponding to the respective cars; control circuits including a source of current, circuit closers at the respective landings, and electromagnetic control devices; signal operating circuits including a source of current, contact means controlled by said electromagnetic controlling devices so to be operated under the control of the respective control circuits, contact means controlled by the corresponding car-operated switches, intercontrolling electromagnetic devices associated together according to floors and directions of travel of the cars, and corresponding car signals; and each signal operating circuit initially including a resistance sufficient to prevent effective operation of the corresponding car signal; contact means controlled by said intercontrolling electromagnetic devices and adapted to short-circuit said resistance in any signal operating circuit upon energization of the corresponding intercontrolling electromagnetic device, so as to permit effective operation of the corresponding car signal; and interlock means operated by said intercontrolling electromagnetic devices, and adapted upon operation thereof by the intercontrolling electromagnetic device corresponding to one car to prevent effective operation of any of the other intercontrolling electromagnetic devices associated therewith.

10. An elevator signal system as set forth in claim 9 and comprising in addition a manually operated transfer switch in each car adapted to open the signal operating circuits corresponding to that car.

11. An elevator signal system for a plurality of cars comprising car signals in the respective cars; a car operated switch corresponding to each car and having contacts corresponding to the respective floors and directions of travel of the car and having means operated in correspondence with the movement of the car to control circuit connections at such contacts; signal operating circuits including a source of current, the respective car signals, and corresponding contacts of the car operated switches; control circuits including a source of current, circuit closers at the landings, and electromagnetic means; circuit closers included in the respective signal operating circuits and operated by the respective electromagnetic means aforesaid to close the respective signal operating circuits; each signal operating circuit also including an electro-magnet of sufficient resistance to prevent operation of the signal, and also including a switch controlled by said electro-magnet, and connections including said switch and a part of said electro-magnet and adapted to short circuit said part of the electro-magnet to reduce the resistance of the circuit upon operation of the electro-magnet, so as to cause increased current to flow in the corresponding signal operating circuit; and an interlocking member for each floor and direction of travel, means mounting each of said members for cooperation with all of the electro-magnetically operated switches for the corresponding floor and direction of travel to prevent operation of any of such switches while any other such switch for that floor and direction of travel is in operation.

12. An elevator signal system as set forth in claim 11 and comprising in addition a manually operated switch in each car adapted to open the signal operating circuits corresponding to that car, and thereby release the interlocking member so as to permit operation of any other electromagnetically operated switch corresponding to the same floor and direction of travel.

13. In a multiple elevator signal system, car signals in the respective cars and signal operating circuits therefor; control circuits including manually operated circuit closers at the respective landings, and control electro-magnets; means for establishing said signal operating circuits, comprising switch means operated in correspondence with the movement of the respective cars, and switch means operated by the control electro-magnets corresponding to the respective floors, means for supplying current to said signal operating circuits and said control circuits; a resistance included in each of said signal operating circuits and sufficient to prevent effective operation of any car signal by the initial current in the corresponding signal operating circuit upon establishment thereof, means operated by said initial current to short-circuit said resistance and permit effective operation of the corresponding car signal, and interlock means operable by the short-circuiting means for any one of said circuits to prevent said short-circuit means for any of the other circuits for the same floor from operating.

14. An intercontrolling means for a plurality of circuits comprising, in combination with a plurality of branch conductors included in the respective circuits and with a conductor common to all of said circuits; electromagnet means individual to said circuits and each comprising a relatively low resistance portion and a relatively high resistance portion connected in series; means connecting one end of each of said electromagnet means to said common conductor, means connecting the other end of each of said electromagnet means to the corresponding branch conductor; normally open switches individual to the respective electromagnet means, the resistance of said switches being less than that of the high resistance portions of the corresponding electromagnet means and each of said switches having armature means in position to be attracted by the corresponding electromagnet means and being normally movable independently into closed position upon such attraction of said armature means; means connecting each of said switches in shunt to the high resistance portion of the corresponding electromagnet means; and interlock means operable upon the closing of any one of said switches to prevent any other of said switches from being closed.

In testimony whereof I have hereunto subscribed my name this 24th day of May, 1929.

ROBERT H. GAYLORD.